(12) United States Patent
Yang (10) Patent No.: US 6,552,445 B1
(45) Date of Patent: Apr. 22, 2003

(54) ELECTRONIC APPARATUS AND CIRCUIT BOARD

(75) Inventor: Shoudu Yang, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/502,345

(22) Filed: Feb. 10, 2000

(30) Foreign Application Priority Data

Aug. 26, 1999 (JP) .......................................... 11-239390

(51) Int. Cl.⁷ ................................................ H02J 1/00
(52) U.S. Cl. ............................ 307/38; 307/39; 307/140
(58) Field of Search ............................. 307/29, 38–42, 307/112, 115, 116, 140, 64–66; 713/324, 321, 330, 340, 323, 320

(56) References Cited

U.S. PATENT DOCUMENTS

| | | | | |
|---|---|---|---|---|
| 5,339,445 A | * | 8/1994 | Gasztonyi | 395/750 |
| 5,729,061 A | * | 3/1998 | Narita | 307/116 |
| 5,737,616 A | * | 4/1998 | Watanabe | 395/750.08 |
| 5,796,982 A | * | 8/1998 | Iwami et al. | 395/500 |
| 5,838,983 A | * | 11/1998 | Atkinson | 395/750.06 |
| 5,959,368 A | * | 9/1999 | Kubo et al. | 307/39 |

FOREIGN PATENT DOCUMENTS

JP    10-178738    6/1998

* cited by examiner

Primary Examiner—Fritz M Fleming
(74) Attorney, Agent, or Firm—Armstrong, Westerman & Hattori, LLP (57) ABSTRACT

An electronic apparatus feeds a power to loads in response to a plurality of action modes. The electronic apparatus comprises a power source in the form of, e.g., an on/off controllable-DC/DC converter for providing a predetermined DC power as its output, a first switch circuit disposed on a power supply line extending from the power source to a first load, a second switch circuit disposed on a power supply line to a second load diverging from the input side of the first switch circuit, and a control circuit for providing an on/off control of the power source, the first switch circuit and the second switch circuit in response to the action modes.

10 Claims, 12 Drawing Sheets

| POWER STATUS | CONTENTS |
|---|---|
| S0 | ALL DEVICES OPERATE AT MAXIMUM SPEED, WITH NO INOPERATIVE DEVICE. |
| S1 | CPU CLOCK INTERNALLY STOPS, WITH NO INOPERATIVE DEVICE. |
| S2 | CPU IS INOPERATIVE (UNSUPPORTED) |
| S3 | MOST DEVICES INCLUDING CPU, HDD AND LCD ARE INOPERATIVE. IN THIS CASE, SDRAM AND CORE LOGIC CHIP SET FOR CONTROLLING SDRAM IN SELF-REFRESH MODE REMAIN OPERATIVE. |
| S4 | MOST DEVICES INCLUDING SDRAM ARE INOPERATIVE. IN THIS CASE, SOME IC'S AND PART OF CORE LOGIC CHIP SET HAVING TO OPERATE EVENTS (POWER BUTTONS, ETC.) FOR WAKING UP SYSTEM REMAIN OPERATIVE. |
| S5 | SAME AS S4 EXCEPT THAT NO DATA IS SAVED IN HDD |
| S3-CD | SAME AS S3 EXCEPT THAT CD-ROM, AUDIO AMPLIFIER AND CD PLAYER CONTROLLER ARE OPERATIVE |
| S4/5-CD | SAME AS S4 OR S5 EXCEPT THAT CD-ROM, AUDIO AMPLIFIER AND CD PLAYER CONTROLLER ARE OPERATIVE |

FIG. 8

| POWER STATUS | CONTROL SIGNAL E1 | CONTROL SIGNAL E2 | CONTROL SIGNAL E3 | CONTROL SIGNAL E4 | MODE |
|---|---|---|---|---|---|
| S0 | On | On | On | On | START |
| S1 | On | On | On | On | SLEEP |
| S2 | — | — | — | — | — |
| S3 | Off | On | Off | On | SUSPEND |
| S3-CD | Off | On | On | On | SUSPEND/CD |
| S4/5 | Off | Off | Off | Off | STOP |
| S4/5-CD | Off | Off | On | On | STOP/CD |

FIG. 9A

POWER-ON MODE (S0 STATUS)

FIG. 9B

SLEEP MODE (S1 STATUS)

FIG. 9C

SUSPEND MODE (S3 STATUS)

FIG. 9D

SUSPEND/CD MODE (S3-CD STATUS)

ELECTRONIC APPARATUS AND CIRCUIT BOARD

BACKGROUND OF THE INVENTION

1. Field of the Invention

The present invention relates generally to an electronic apparatus and a circuit board for use in, e.g., a notebook-sized personal computer of a type supplying an electric power to loads in response to a plurality of action modes, and more particularly to an electronic apparatus and a circuit board designed to supply an electric power to the loads consisting of a plurality of groups in response to the action modes including the supply of power and the suspension.

2. Description of the Related Arts

Figure 1:
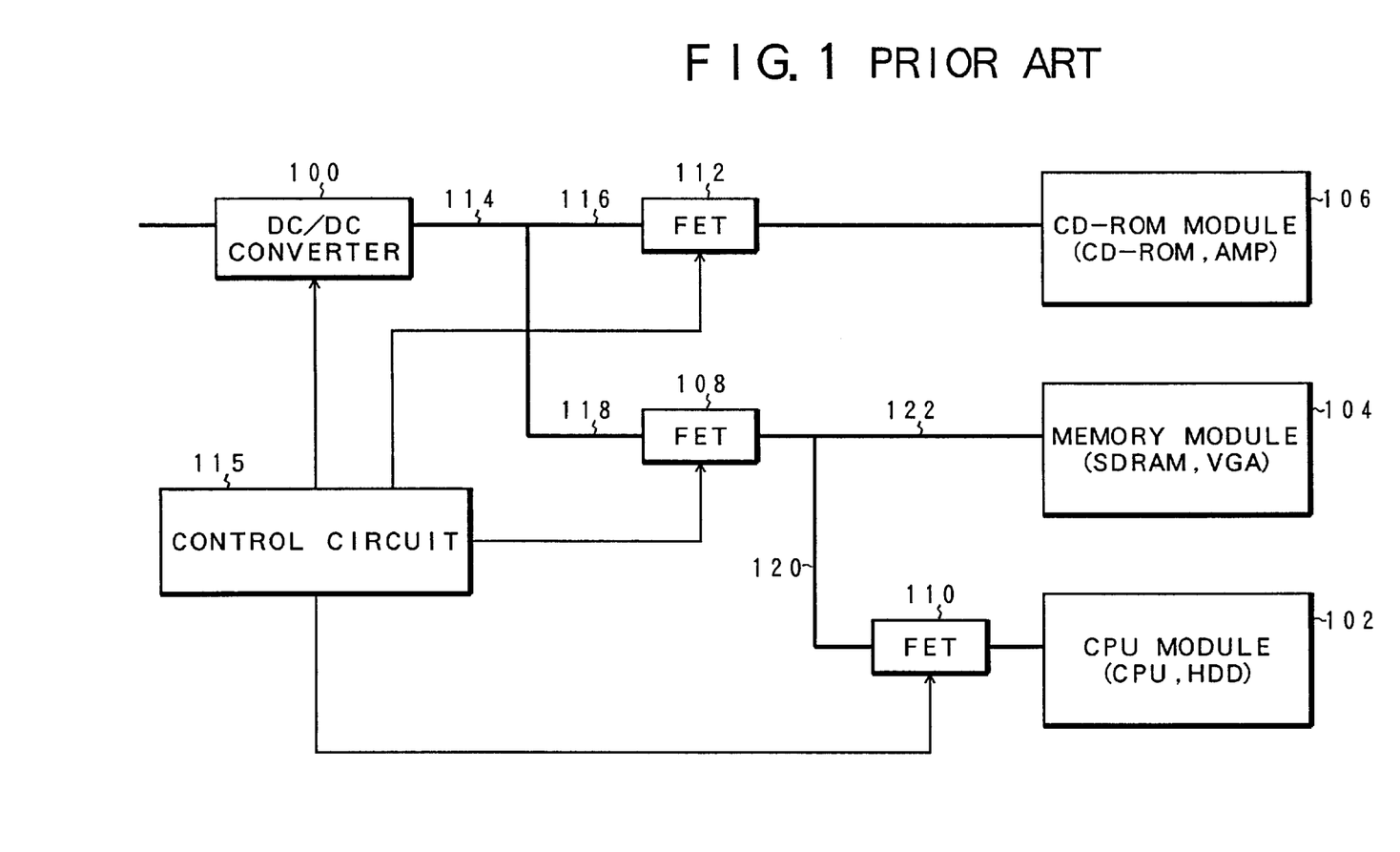
FIG. 1 is a circuit block diagram of a conventional apparatus.

Referring first to FIG. 1, a typical circuit is shown which feeds electric powers for action to a diversity of devices, i.e., loads incorporated in notebook-sized personal computers. In response to action modes, a DC/DC converter 100 serving as a DC power source feeds powers to the loads, e.g., a CPU module 102, a memory module 104 and CD-ROM module 106. In this event, the CPU module 102 includes a CPU and an HDD, and the memory module 104 includes an SDRAM and a VGA. The CD-ROM module 106 includes a CD-ROM player and an AMP. A power supply line 114 from DC/DC converter 100 diverges at a node into a line 116 and a line 118 which connects via an FET switch circuit 112 to the CD-ROM module 106. The line 118 further diverges into a line 120 and a line 122 which connect to the CPU module 102 and the memory module 104, respectively. FET switches 108, 110 and 112 are disposed on the lines 118, 120 and 116, respectively, and are on/off controlled by a control circuit 115 in such a manner as to conform the action modes. The control circuit 115 provides an on/off control of the DC/DC converter 100 as well. Once a power switch of a personal computer is acted upon, the control circuit 115 provides a control of the activation mode to turn on the DC/DC converter 100 as well as to turn on all of the FET switches 108, 110 and 112, allowing powers to be supplied to all of the CPU module 102, the memory module 104 and the CD-ROM module 106 for their respective actions. When a suspend switch is operated in those actions, the control circuit 115 provides a suspend mode to turn off the FET switch 110 to halt the supply of power to the CPU module 102. In this state, a resume switch is operated so that the FET switch circuit 110 is turned on and restored to its pre-suspension state. The migration to the suspension mode could be designated by software.

By the way, in the conventional electronic circuit supplying electric powers to the loads in response to the action modes, a relatively large amount of current of, e.g., 3 amperes flows through the CPU module 102 whereas a small amount of current of, e.g., 0.3 ampres flows through the memory module 104. As a result of this, 3.3 ampere current, the sum of the 3 ampere current through the CPU module 102 and the 0.3 ampere current through the memory module 104, flows through the FET switch circuit 108. This results in a deficiency that a combined current to two loads flows through the FET switch circuit 108, causing a greater power loss. Furthermore, the FET switch circuit 108 needs to be an PET having a large current capacity so as to allow a passage of as large a current as 3.3 amperes therethrough, which results in an increased circuit mounting area as well as in increased costs.

SUMMARY OF THE INVENTION

According to the present invention there are provided an electronic apparatus and a circuit board which have contrived paths for supplying an electric power to loads in response to action modes so as to allow a minimal amount of current to flow through switch circuits turning on/off the supply of electric power, thereby reducing the power loss as well as the circuit mounting area.

A first aspect of the present invention provides an electronic apparatus for feeding an electric power to loads in response to a plurality of action modes, the electronic apparatus comprising an on/off controllable power source circuit for providing an electric power as its output to the loads; a first switch circuit disposed on a power supply line extending from the power source circuit to a first load; a second switch circuit disposed on a power supply line to a second load diverging from the input side of the first switch circuit; and a control circuit for providing an on/off control of the power source circuit, the first switch circuit and the second switch circuit in response to the plurality of action modes. In this manner, separate power supply lines are disposed which extend from the power source to the respective loads and which are each provided with a switch circuit, so that each switch circuit allows only a flow of current determined by one load supplied with an electric power, whereby the sum of currents to a plurality of loads is prevented from flowing into a specific switch circuit even though the on/off state of the switch circuit has changed depending on the action modes, thereby reducing the power loss of the switch circuit disposed on the power supply line and diminishing the current capacity to reduce the size of the elements and parts used, for the reduction of the circuit mounting area.

The control circuit in a first action mode turns on the power source circuit, the first switch circuit and the second switch circuit to permit a supply of electric power to the first and second loads. The control circuit in a second action mode turns on the power source circuit and the second switch circuit but off the first switch circuit to permit a supply of electric power to only the second load. Herein, the first action mode is a normal action mode, and the second action mode is a suspend mode permitting a supply of electric power to only a specific, limited load. The first load includes a CPU, and the second load includes a memory.

The electronic apparatus of the present invention further comprises a third switch circuit disposed on a power supply line to a third load diverging from the line on the input side of the first switch circuit, and the control circuit further provides an on/off control of the third switch circuit in response to the action modes. In this event, the control circuit turns on both the power source circuit and the third switch circuit in a third action mode permitting a supply of electric power to the third load in the state of the first action mode, the second action mode or a stop mode. The third load includes a CD drive for replaying a CD-ROM or a CD for example, and the control circuit defines the third action mode independently of the first action mode, the second action mode or the stop mode so as to allow a replaying action of the CD drive.

A second aspect of the present invention provides a circuit board for feeding an electric power to loads in response to a plurality of action modes, the circuit board comprising a first switch circuit disposed on a first power supply line extending from a power source circuit to a first load; a second switch circuit disposed on a second power supply line to a second load diverging from the input side of the first switch circuit; and a control circuit for providing an on/off control of the power source circuit, the first switch circuit and the second switch circuit in response to the plurality of action modes. In this event as well, the circuit board further comprises a third switch circuit disposed on a third power supply line to a third load diverging from the line on the input side of the first switch circuit, and the control circuit provides an on/off control of the third switch circuit in response to the plurality of action modes.

The above and other objects, aspect, features and advantages of the present invention will become more apparent from the following detailed description with reference to the accompanying drawings.

DETAILED DESCRIPTION OF THE PREFERRED EMBODIMENT

Figure 2:
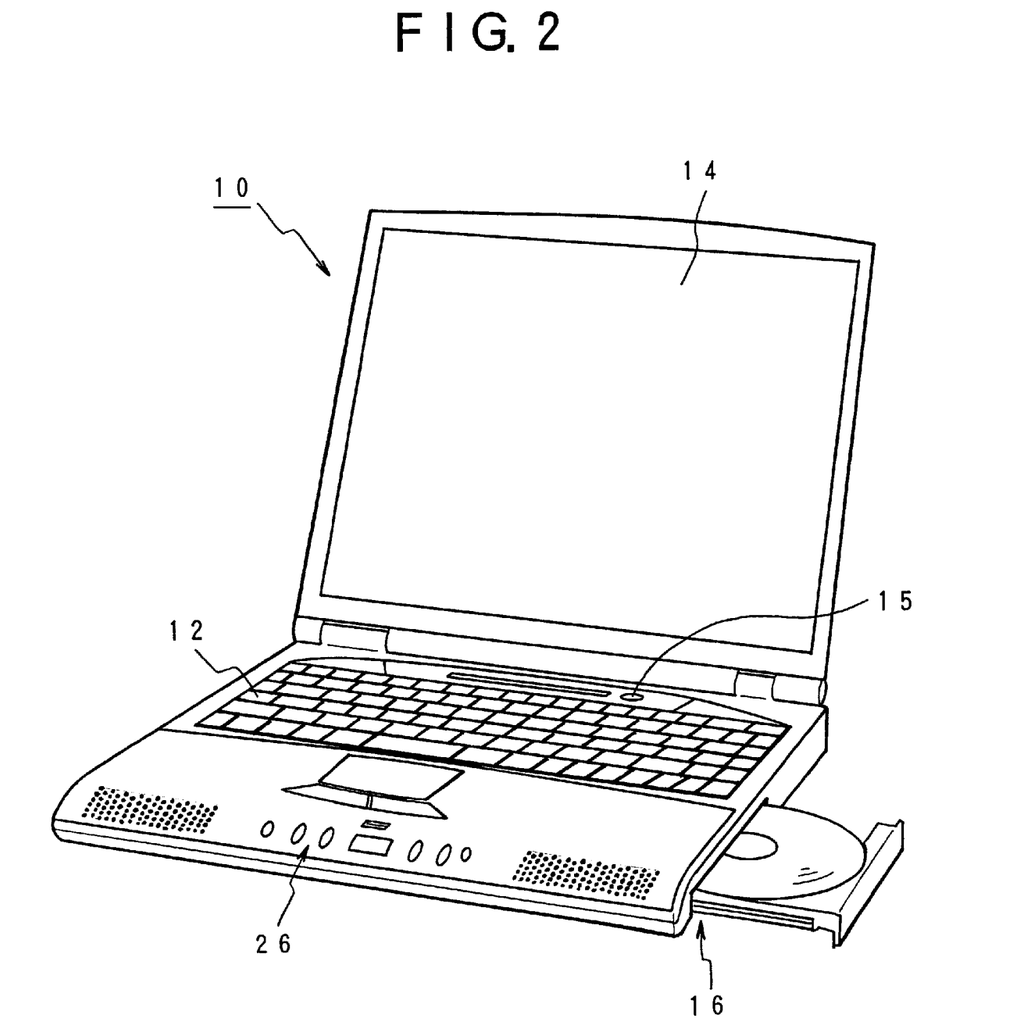
FIG. 2 is an explanatory diagram of a notebook-sized personal computer to which the present invention is applied.

FIG. 2 is an explanatory diagram of a notebook-sized personal computer to which are applied an electronic apparatus and a circuit board in accordance with the present invention. The notebook-sized personal computer is generally designated at 10 and comprises a keyboard 12 provided on its body and a liquid crystal display 14 provided on the inside of its cover which is free to be upwardly opened and downwardly closed with respect to the keyboard 12. A suspend/resume switch 15 is disposed at the top of the keyboard 12 under the bottom of the liquid crystal display 14. The suspend/resume switch 15 is a power switch for supplying an electric power to the personal computer and can be used as a switch for suspension after the supply of the electric power or for resumption to restore the pre-suspension state. A CD-ROM drive 16 is disposed at the side of the body and includes a tray which can be drawn out to mount a CD thereon as shown. A CD operation unit 26 is disposed along the proximal end of the body carrying the keyboard 12.

Figure 3:
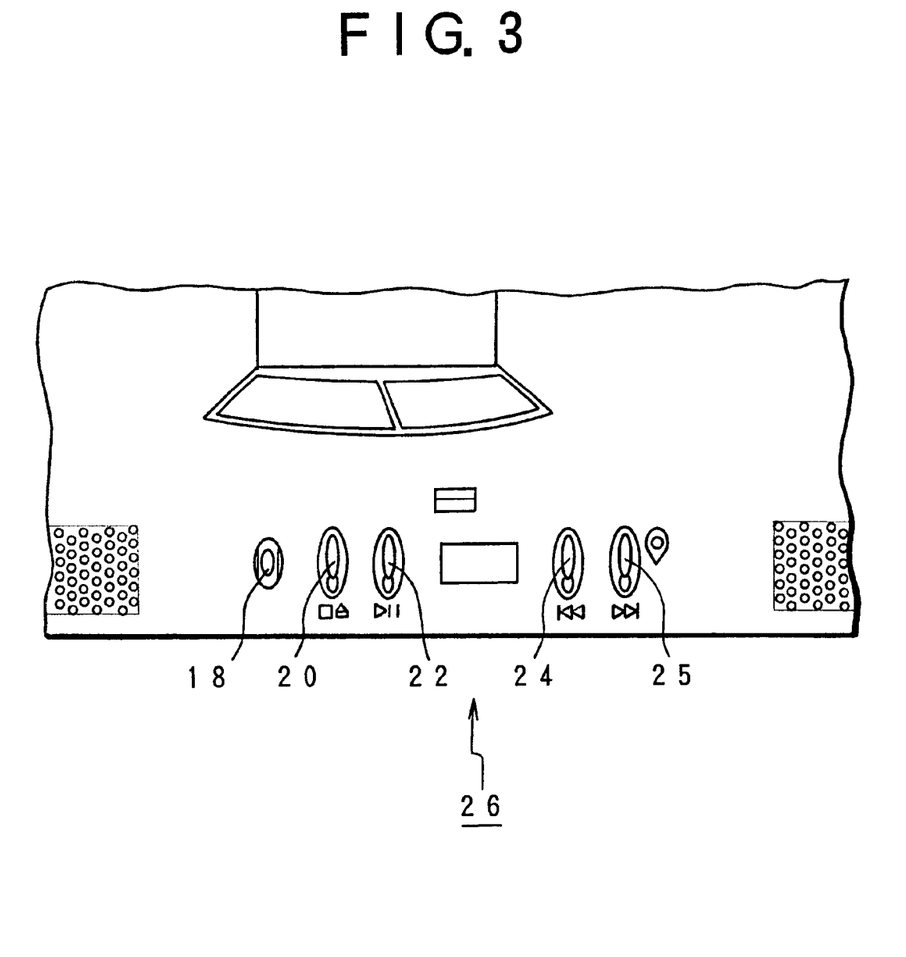
FIG. 3 is an explanatory diagram of a CD operation unit of FIG. 2 in an enlarged scale.

FIG. 3 illustrates the CD operation unit 26 of FIG. 2 in an enlarged scale, the CD operation unit 26 having a plurality of switch buttons. The CD operation unit 26 includes, from left to right, a mode switch 18 and four switch buttons 20, 22, 24 and 25. The mode switch 18 has three switching positions, "application", "lock" and "CD player". In response to these switching positions, four switch buttons 20, 22, 24 and 25 arranged on the right side thereof are switched into the application start or the CD replay. The "lock" position nullifies the functions of the switch buttons 20, 22, 24 and 25. Upon the switching to the CD replay by means of the mode switch 18, the switch button 20 acts as a stop/eject button, the switch button 22 acts as a replay/suspend button, the switch button 24 acts as a fast reverse button, and the switch button 25 acts as a fast forward button. In the state of switching to the CD replay by the mode switch 18, the suspend/resume switch 15 is used to put the personal computer 10 into stop mode (power-off state) so that the CD can be replayed by the operations of the buttons on the CD operation unit 26. During the action as a result of power-on by the suspend/resume switch 15, the CD replay can be performed at the same time. Furthermore, also in the state of suspension by the operation of the suspend/resume switch during the action, the switching operation of the CD operation unit 26 solely allows the CD replay.

Figure 4:
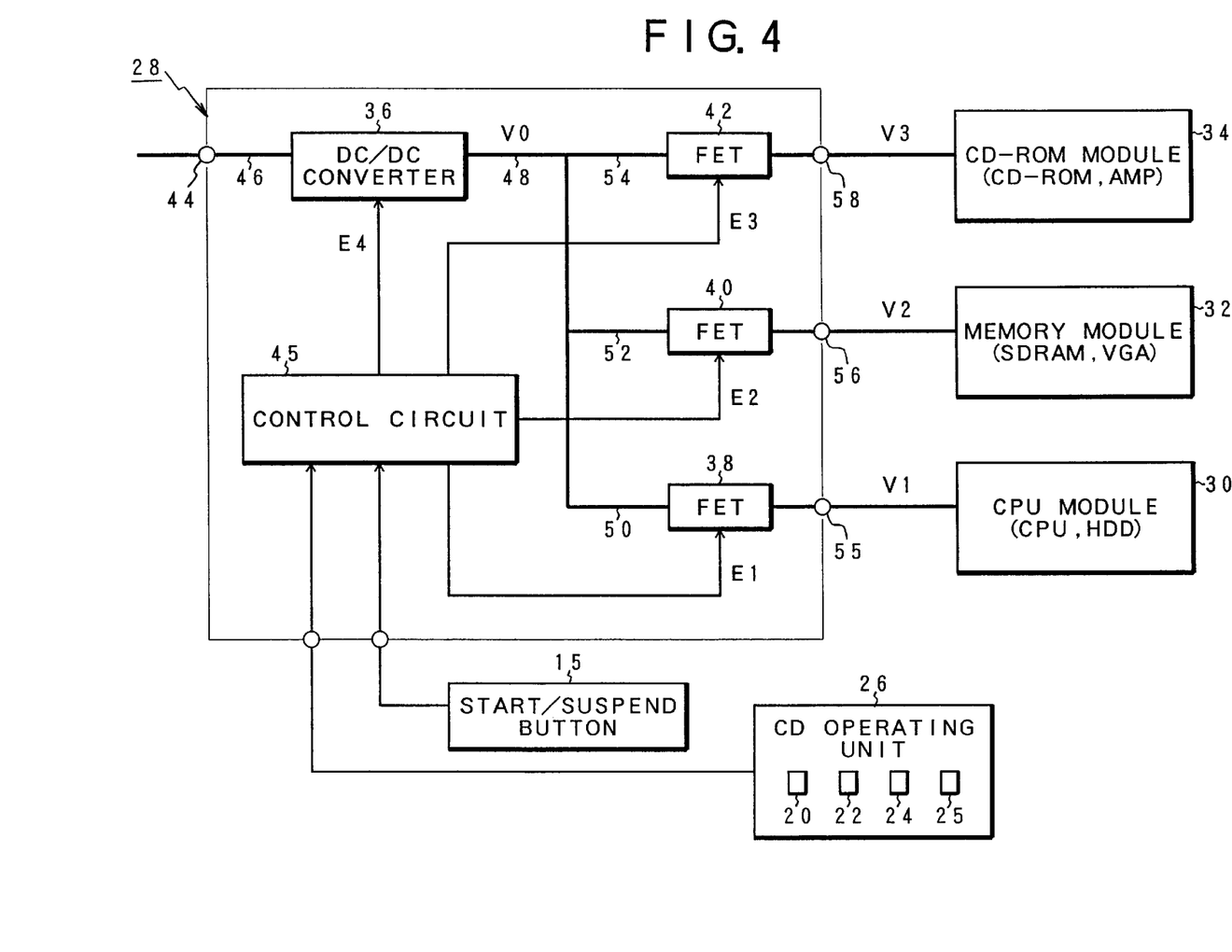
FIG. 4 is a circuit block diagram showing an embodiment of the present invention.

FIG. 4 is a circuit block diagram of an embodiment of an electronic circuit incorporated in the notebook-sized personal computer 10 of FIG. 2. The electronic apparatus of the present invention comprises a circuit board 28 and loads incorporated in the personal computer. The circuit board 28 serves to supply an electric power to the loads. In this embodiment, the loads supplied with powers from the circuit board 28 are divided into three load groups for the control of supply of electric powers. The first load group includes a CPU and an HDD and is hereinafter referred to as a CPU module 30. The second load group includes an SDRAM and a VGA and is hereinafter referred to as a memory module 32. The third load group includes a CD-ROM drive and an amplifier for the sound output and is hereinafter referred to as a CD-ROM module 34. Although a single load group includes a plurality of loads by way of example, the single group may consist of a single load. In order to ensure that power is supplied to the three separate modules, i.e., the CPU module 30, memory module 32 and CD-ROM module 34 in response to the action modes, the circuit board 28 comprises a DC/DC converter 36 acting as a DC power source, a first FET switch circuit 38, a second FET switch circuit 40 and a third FET switch circuit 42, as well as control circuit 45. The DC/DC converter 36 is supplied with a predetermined DC power through a power input terminal 44 having an input power line 46 connected thereto and provides as its output an electric power of e.g., DC 5V to a power line 48 on the output side. In response to a control signal E4 from the control circuit 45, the DC/DC converter 36 can provide an on/off control of power output and power output stop. The DC/DC converter 36 can be for example a switching regulator. The power line 48 from the DC/DC converter 36 diverges at a node into three power lines 50, 52 and 54, which connect via power output terminals 55, 56 and 58 to the three separate loads, i.e., the CPU module 30, the memory module 32 and the CD-ROM module 34, respectively. The FET switch circuits 38, 40 and 42 disposed on the power lines 50, 52 and 54 to the respective loads are turned on/off by control signals E1, E2 and E3, respectively, from the control circuit 45, and are used for the control of the supply of powers to the loads. In order to set the action modes, the control signal 45 accepts a signal from the CD operation unit 26 provided with the mode switch 18 and the four switch buttons 20, 22, 24 and 25.

Figure 5:
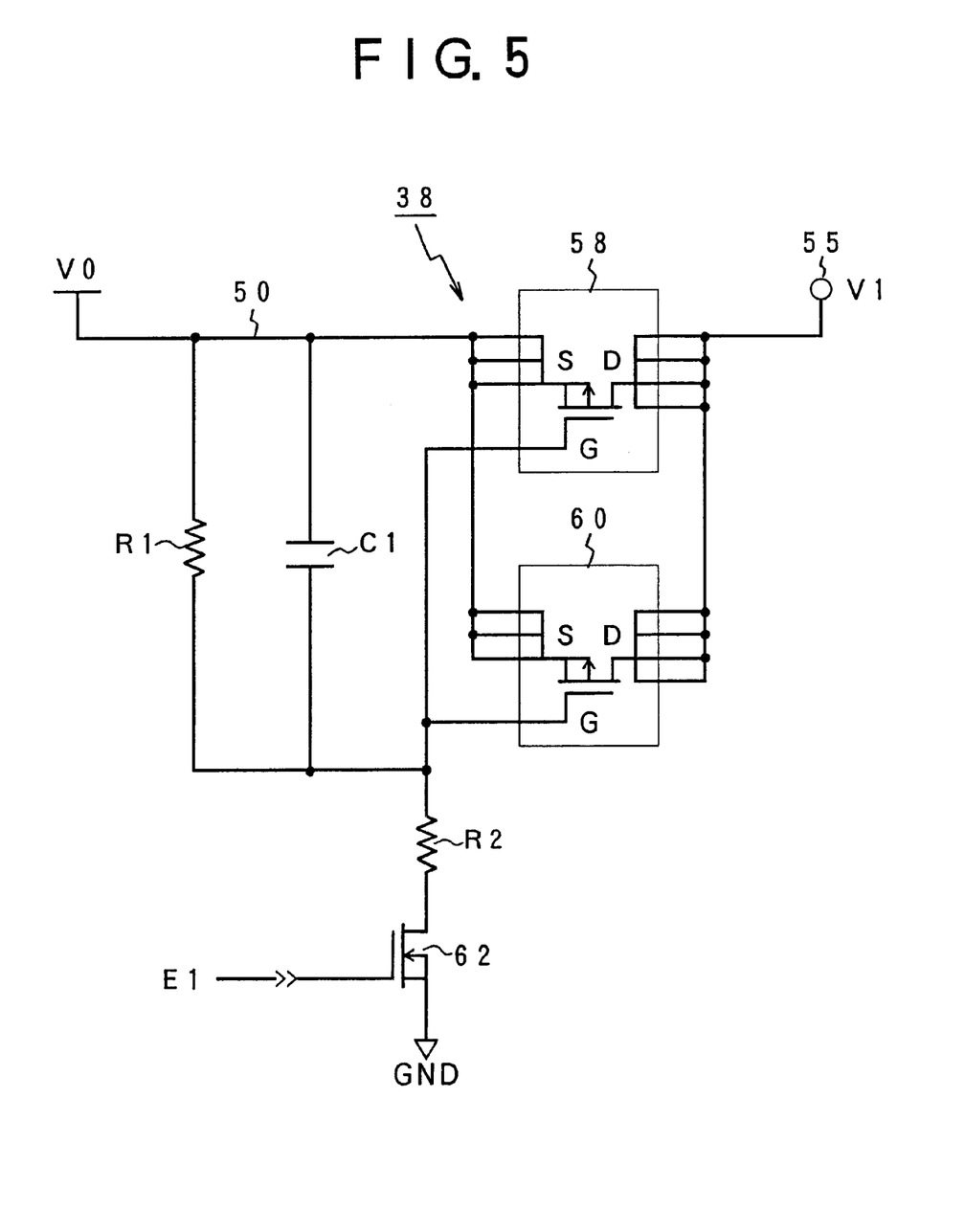
FIG. 5 is a circuit diagram of a first FET switch circuit of FIG. 4.

FIG. 5 is a circuit diagram of the first FET switch circuit 38 disposed on the power line 50 to the CPU module 30 of FIG. 4. An output voltage Vo from the DC/DC converter is applied to the right side of the power line 50 and then to the FET switch circuit 38, whose output is fed to the power terminal 55 to fetch an output voltage V1 for the CPU module 30. Due to a relatively large amount of current flowing through the CPU module 30 in this embodiment, the FET switch circuit 38 consists of two FET elements 58 and 60 which are connected with each other in parallel to secure the current capacity for the supply of current. The FET elements 58 and 60 can be for example μTA1707. An FET 62 is connected via a resistor R2 to the gates of the FET elements 58 and 60 connected in parallel, with the gate of the FET 62 being fed with the control signal E1 from the control circuit 45. Between the gate and the source of the parallel connection circuit of the FETs 58 and 60 there is provided a speedup circuit consisting of a resistor R1 and a capacitor C1 which are connected with each other in parallel.

Figure 6:
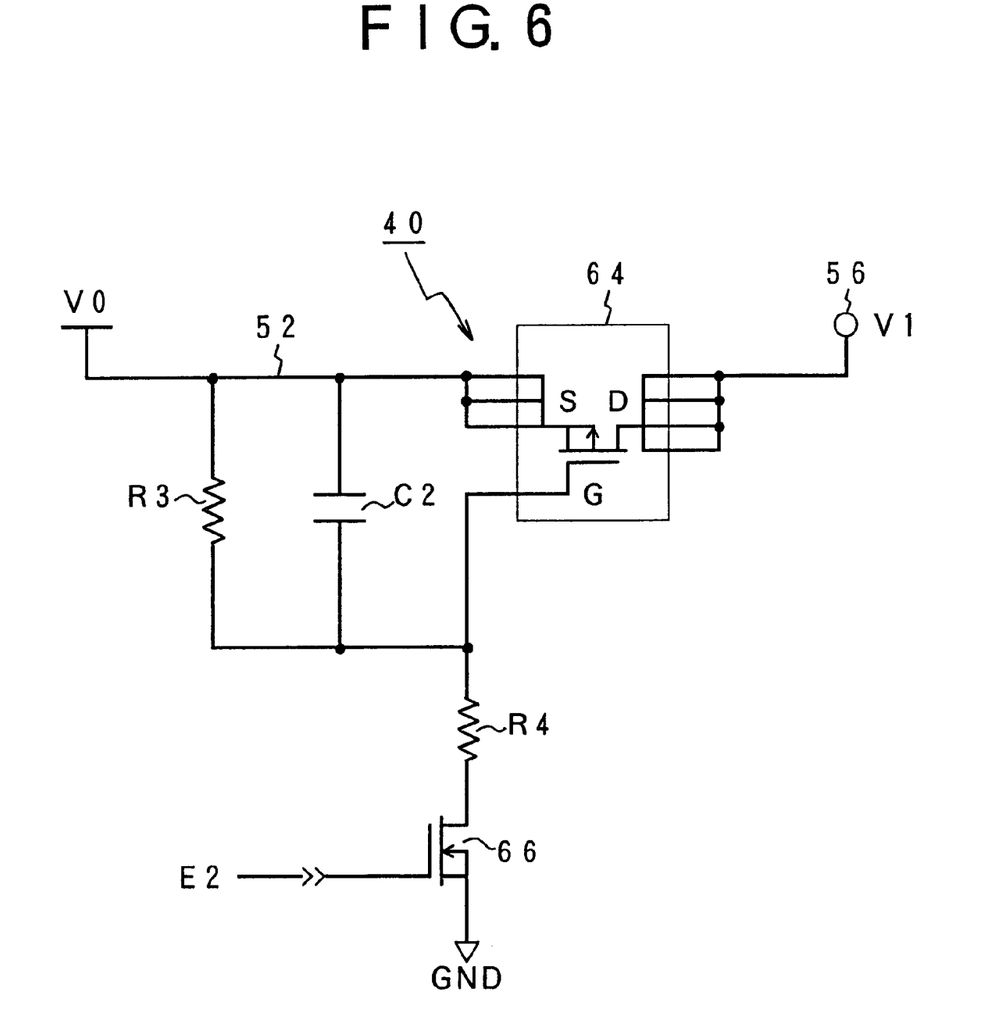
FIG. 6 is a circuit diagram of a second FET switch circuit of FIG. 4.

FIG. 6 is a circuit diagram of the second FET switch circuit 40 of FIG. 4. Due to a sufficiently small amount of, e.g., one-tenth of that of the CPU module 30, current fed to the memory module 32 acting as the load, the second FET switch circuit 40 includes only one FET element 64 to secure a sufficient current capacity. The FET element 64 has the source and drain which are inserted into the power line 52 subjected on its left-hand side to the output voltage Vo of the DC-DC converter 36 and provided on its right-hand side with the power output terminal 56. The gate of the FET element 64 is connected via a resistor R4 to an FET 66, of which gate is fed with the control signal E2 from the control circuit 45 of FIG. 4. Between the gate and the source of the FET element 64, there are connected in parallel a capacitor C2 and a resistor R3 for speedup. Furthermore, the FET switch circuit 42 disposed on the power line 54 associated with the CD-ROM module 34 of FIG. 4 has also the same circuit configuration as that of FIG. 5 or FIG. 6 so as to conform to its current capacity.

Figure 7:
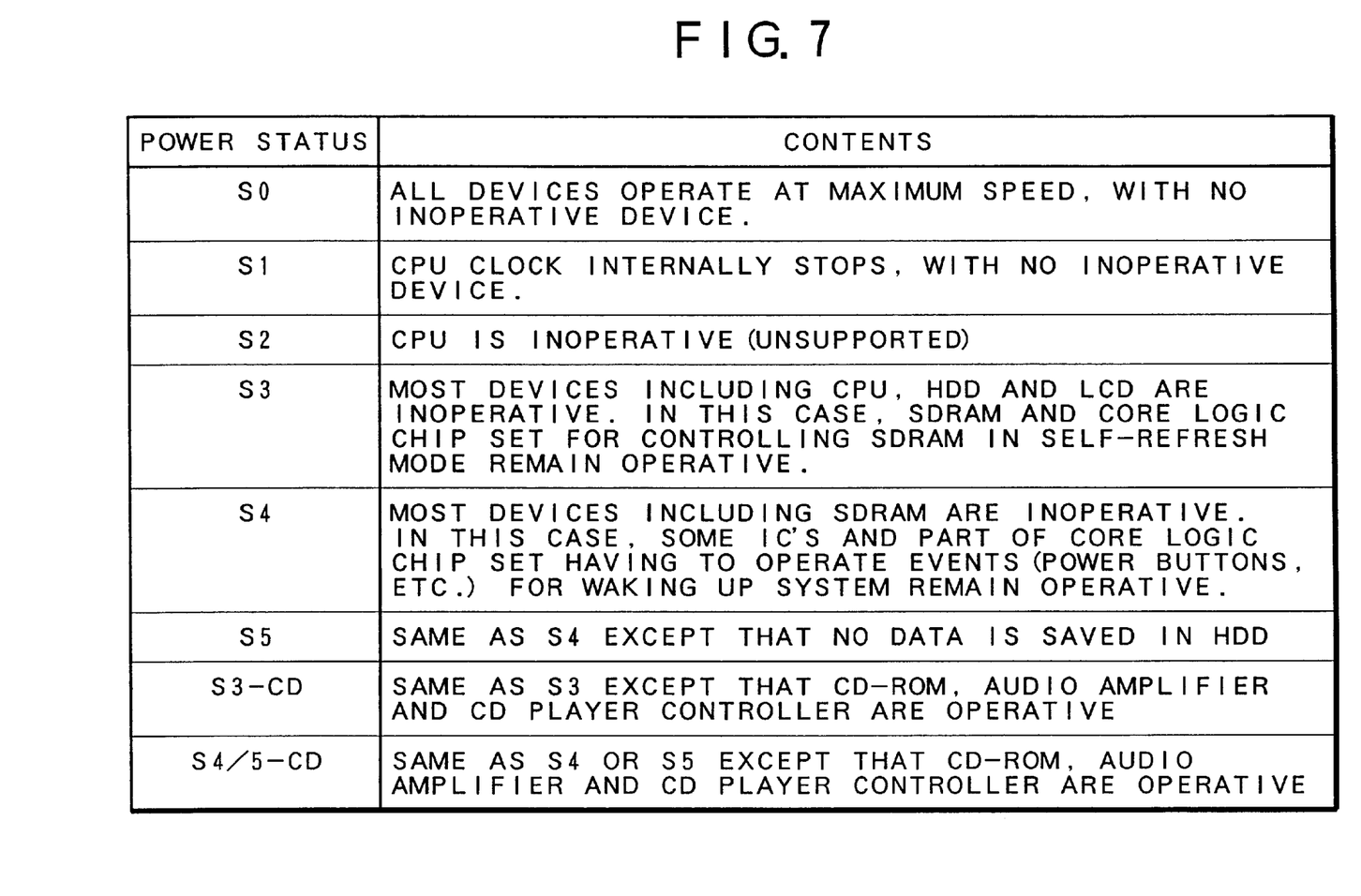
FIG. 7 is an explanatory diagram of the power statuses defined by a control circuit of FIG. 4.

FIG. 7 illustrates the power statuses and the contents thereof in the case where the supply of power is effected by means of the three FET switch circuits 38, 40 and 42 under the control of the control circuit 45 of FIG. 4. The control circuit 45 of FIG. 4 has the power statuses S0 to S5 as well as the power statuses S3-CD and S4/5-CD for supplying a power to the CD player. First, the power status S0 is the state where all the devices are in action at their maximum speeds with no inoperative deenergized. The power status Si is the sleep state where the clock of the CPU is internally halted with no inoperative devices. The power status S2 is the deenergized state of the CPU but is not supported in this embodiment. The power status S3 is the suspended state where most of the devices including the CPU, HDD and LCD are inoperative. At that time, the SDRAM provided in the memory module 32 and the core logic chip set for the control of the SDRAM in the self-fresh mode remain operative. The power status. S4 is the state where the apparatus is turned off after saving the data stored in the SDRAM into the HDD, in order to continue the processing upon the power-on of the apparatus. This processing is called Save to Disk. Furthermore, the power status S3-CD related-to the supply of power to the CD player is the same as the power status S3 except that the CD-ROM drive, the audio amplifier and the CD player controller are operative. The power status S4/5-CD is the same as the power status S4 or S5 except that the CD-ROM drive, the audio amplifier and the CD player controller are operative.

Figure 8:
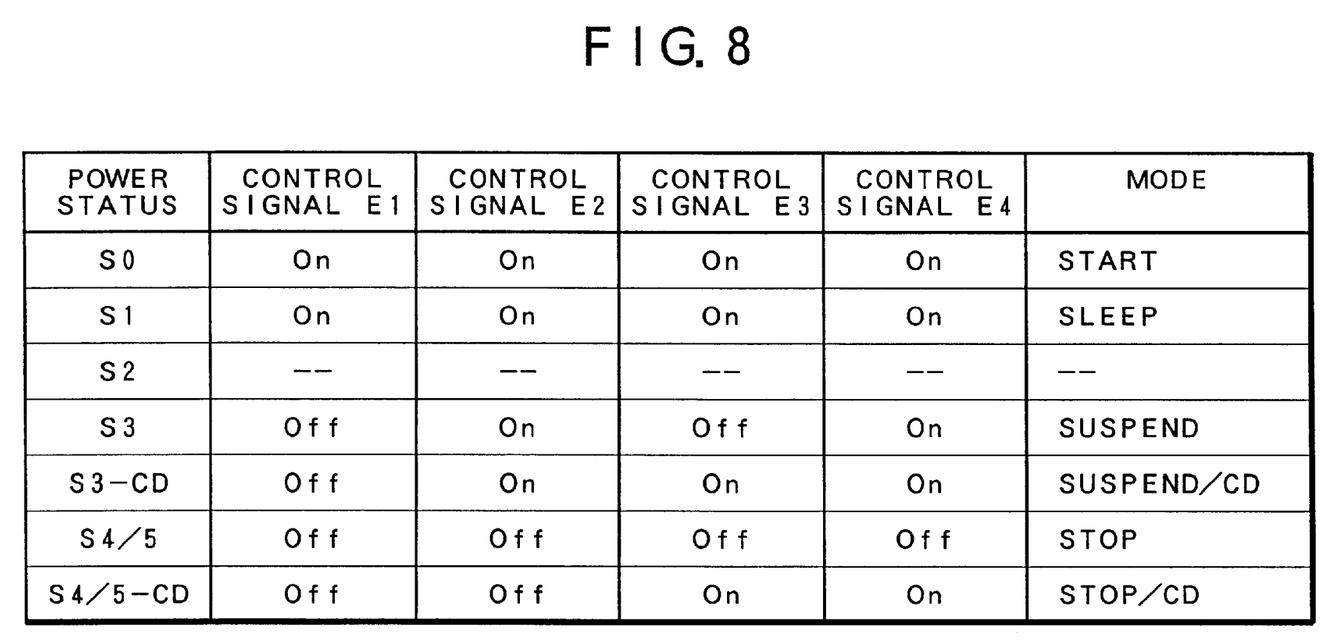
FIG. 8 is an explanatory diagram of the power statuses and control signals of the control circuit of FIG. 4.
Figure 9A:
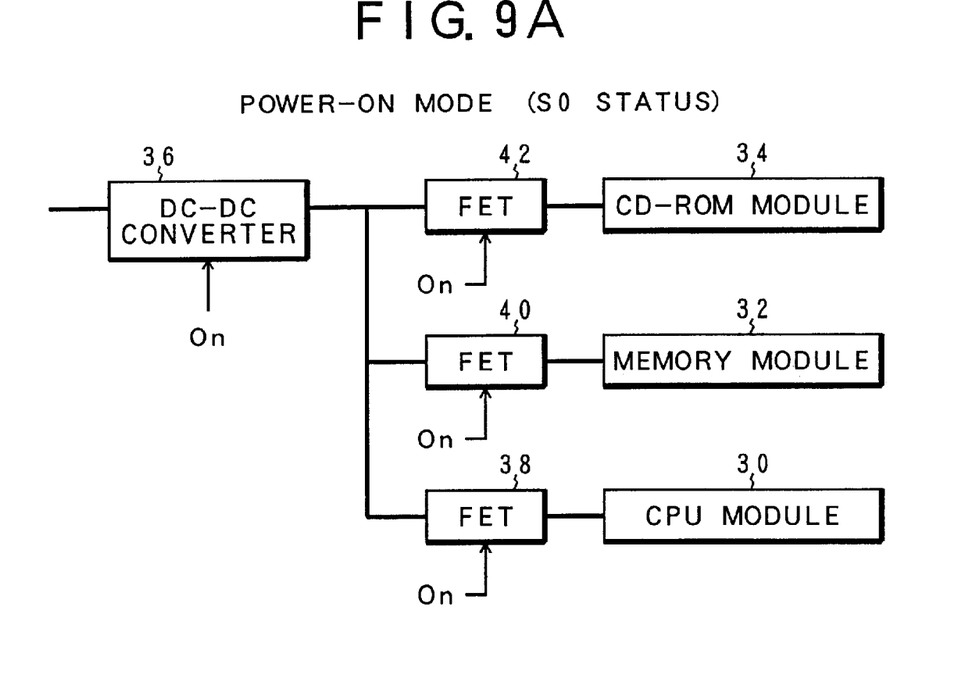
FIGS. 9A to 9F are explanatory diagrams of the supply of power in the power statuses S0, S1, S3, S3-CD, S4/S5, S4/S5-CD of FIG. 8.
Figure 9B:
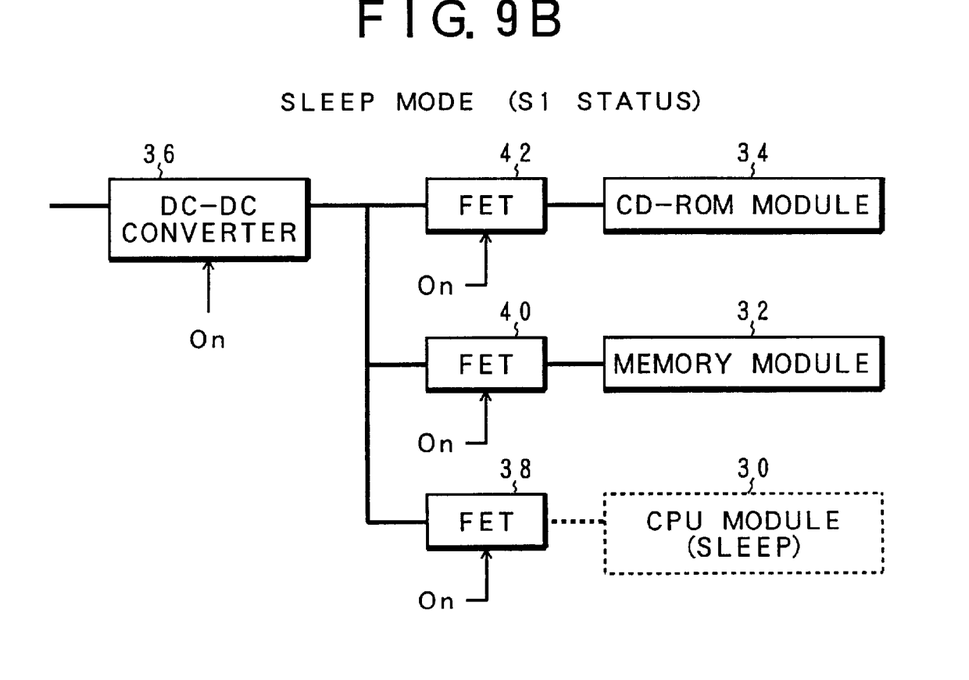
Figure 9C:
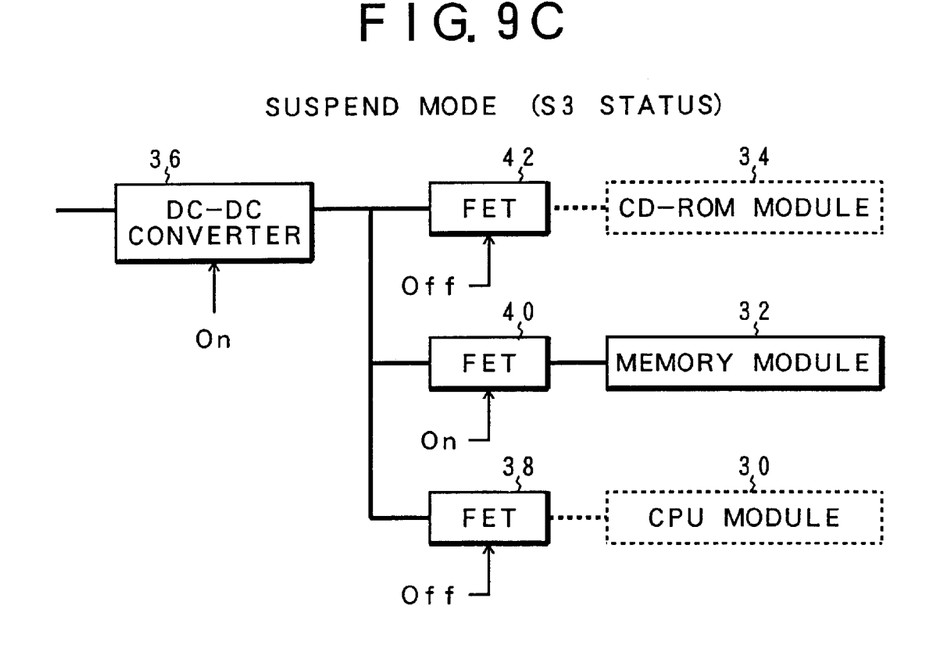
Figure 9D:
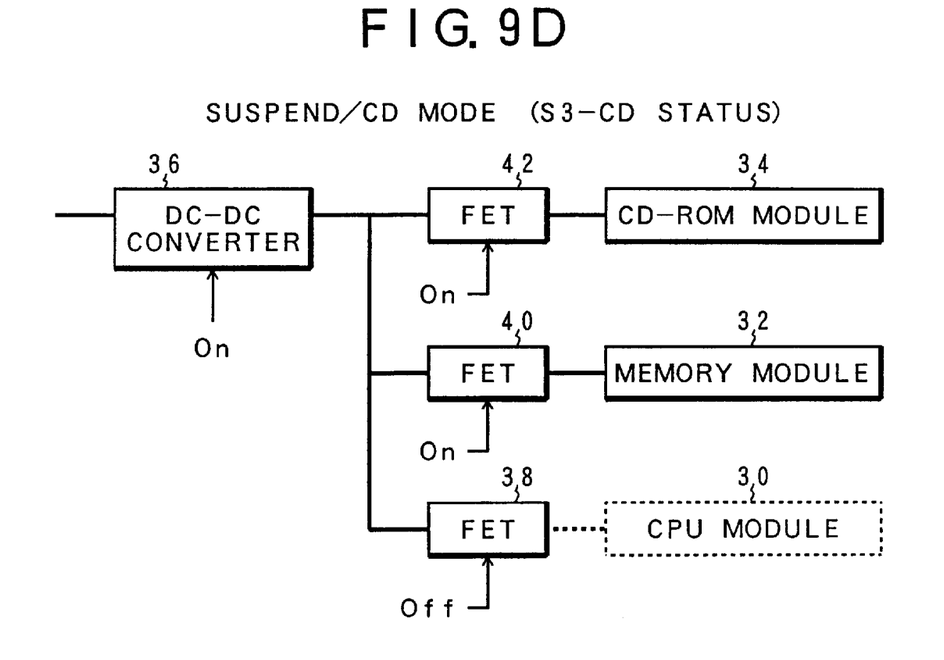
Figure 9E:
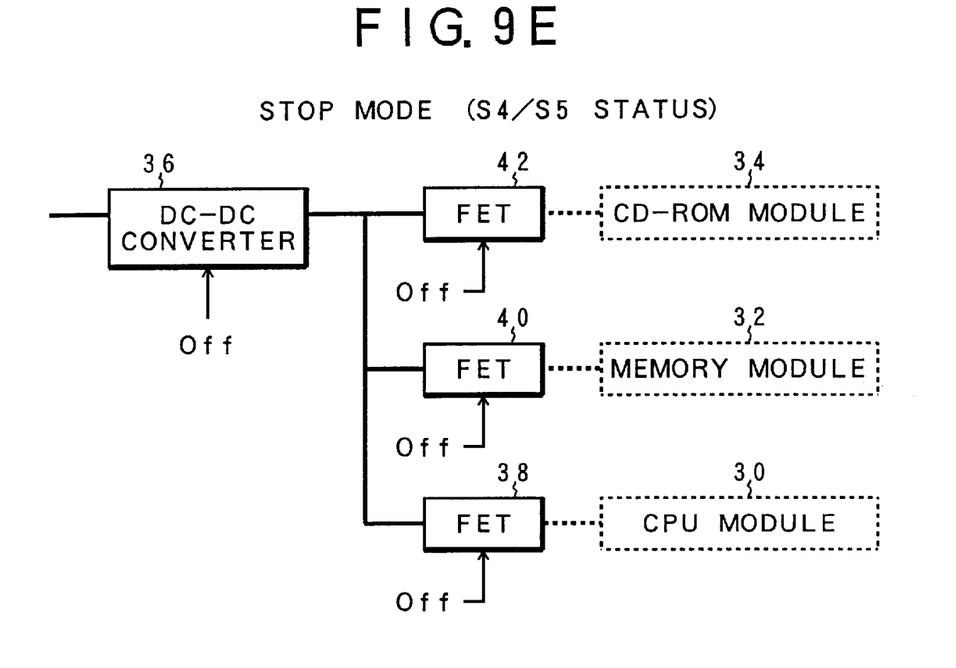
Figure 9F:
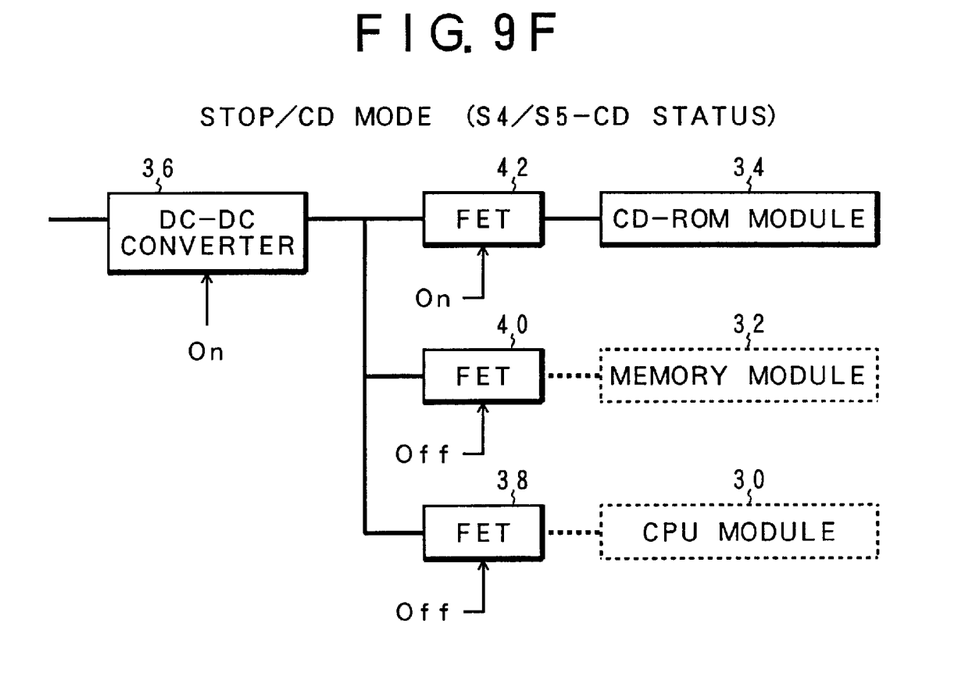
Figure 10A:
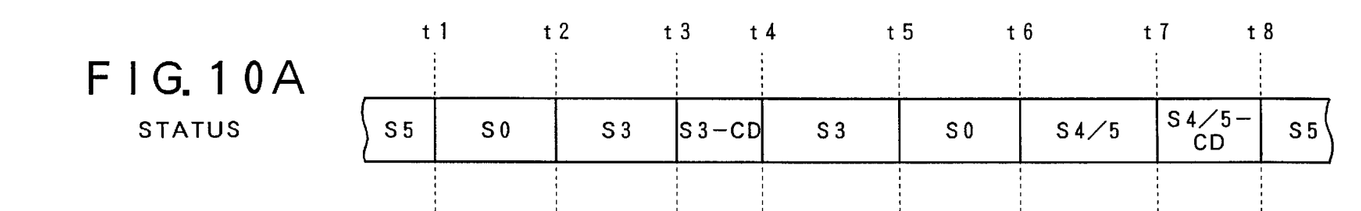
FIGS. 10A to 10E are time charts of the status and the control signals in the action mode of FIG. 4.
Figure 10B:
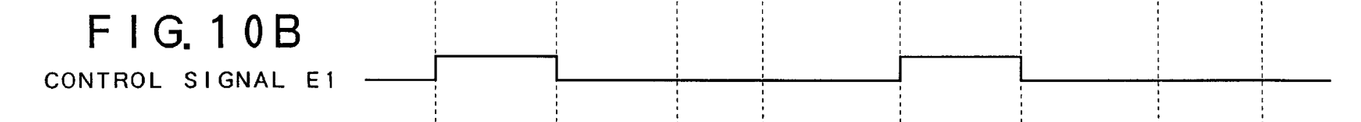
Figure 10C:
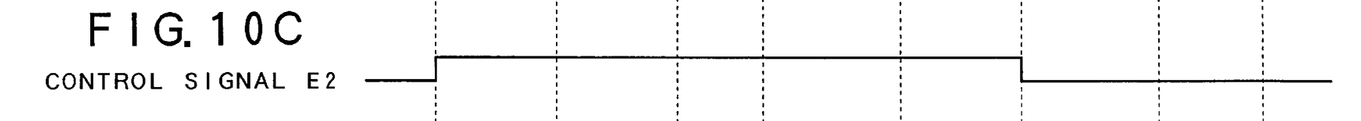
Figure 10D:
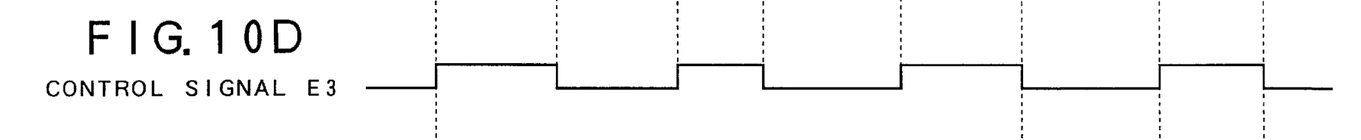
Figure 10E:
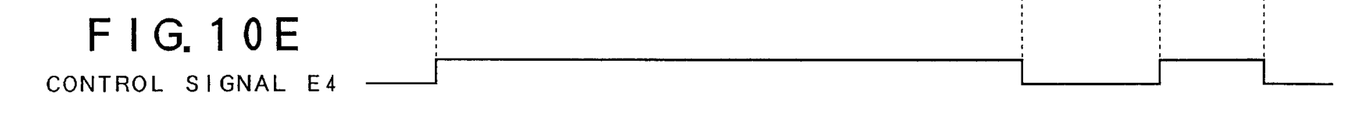

FIG. 8 illustrates the on-off control by the control signals E1, E2, E3 and E4 fed from the control circuit 45 to the FET switch circuits. 38, 40, 42 and the DC/DC converter 36, as well as the action modes at that time. First, the power status S0 allows all the control signals E1 to E4 to go high, which is the activation mode (normal action mode) obtained when the power is turned on by operating the suspend/resume switch 15. In this activation mode, as can be seen in FIG. 9A, the DC/DC converter 36 goes on with all the FET switch circuits 38, 40 and 42 turned on, resulting in the action state where the power is supplied to all of the CPU module 30, the memory module 32 and the CD-ROM module 34. The power status S1 of FIG. 8 allows all of the control signals E1 to E4 to be high similar to the power status S0, with the sleep mode in which the internal clock of the CPU is halted. FIG. 9B illustrates the power supply state achieved by the power status S1, which power supply is the same as that of the S0 status of FIG. 9A, but in which the CPU of the CPU module 30 is in the sleeping state due to the halt of the internal clock. The power status S3 is the suspend mode in which the control signals E1 and E3 go low, with the control signals E2 and E4 remaining high. In this case, as seen in FIG. 9C, the DC/DC converter 36 and the FET switch circuit 40 are turned on, allowing the supply of power to only the memory module 32. The power status S3-CD takes place in the case where the switch button 22 for designating the CD replay has been operated with the power status S3. In this case, the control signal E3, which was low in the power status S3, goes high, with the result that as seen in FIG. 9D, the FET switch circuit 42 is turned on, permitting the power to be supplied to the CD-ROM module 34 as well. The power status S4/5 is the stop mode in which all of the control signals E1 to E4 go low. In this stop mode, as seen in FIG. 9E, the DC/DC converter and the FET switch circuits 38, 40 and 42 are all turned off, prohibiting the power from being supplied to the load modules. The power status S4/5-CD takes place in the case where the switch button 22 for designating the CD replay has been operated with the power status S4/5. In this case, the control signals E3 and E4, which were low in the power status S4/5, go high. As a result of this, as seen in FIG. 9F, the DC/DC converter 36 and the FET switch circuit 42 are tuned on, permitting the power to be supplied to the CD-ROM module 34.

FIGS. 10A to 10E are time charts of the statuses upon the switching of the action modes in the embodiment of FIG. 4, and of the control signals E1 to E4 corresponding thereto. The status S5 continues as the stop mode till the time t1. Once the power-on of the apparatus is designated at the time t1, the control circuit 45 detects it, allowing all the control signals E1 to E4 to go high, with a migration to the status S0 acting as the activation mode. Then, when detecting a migration to the suspend mode by the operation of the suspend/resume switch 15 at the time t2, the control circuit 45 renders the control signals E1 and E3 low, allowing a migration to the status S3 which is the state of the supply of power to only the memory module 32 as seen in FIG. 9C. In this state, the switch button 22 for designating the CD replay is operated at the time t3, whereupon the control circuit 45 detects a change in the input signal caused by the operation of the switch button 22 and renders the control signal E3 fed to the FET switch circuit 42 high so as to allow a migration to the power status S3-CD as seen in FIG. 9D, to supply a power to the CD-ROM module 34 as well. Also, when the switch button 20 is operated to designate the stop of the CD replay at the time t4, the control circuit 45 detects a change in the input signal caused by the operation of the switch button 20 and turns the control signals E3 for the FET switch circuit 42 low, allowing a migration to the power status S3. Furthermore, at the time t5, the control circuit 45 detects a resumption as a result of the operation of the suspend/resume switch 15, whereupon the control circuit 45 turns the control signals E1 and E3 high to allow a migration to the status S0 of FIG. 9A and hence a restoration to the state of action before the suspension. Then, when the power-off of the apparatus is designated at the time t6 through the OS terminating operation using the keyboard or through the terminating operation by the Save to Disk, the control circuit 45 detects it, rendering all of the control signals E1 to E4 low and allowing a migration to the status S4/5 as the stop mode, to consequently present the power supply state as seen in FIG. 9E. At the time t7, the switch button 22 for designating the CD replay is operated in the status S4/5 as the stop mode, whereupon the control circuit 45 detects a change in the input signal as the result of the operation of the switch button 22 and renders the control signal E3 to the FET switch circuit 42 and the control signal E4 to the DC/DC converter 36 high, allowing a migration to the power status S4/5-CD, to present the state of supply of power shown in FIG. 9F in which the CD-ROM module 34 is supplied with the power. It is thus possible to replay the CD even though the apparatus is in the stop mode. Then, when the switch button 20 is operated to designate a stop of the CD replay at the time t8, the control circuit 45 detects a change of the input signal caused by the operation of the switch button 20 and renders the control signal E3 to the FET switch circuit 42 and the control signal E4 to the DC/DC converter 36 low, allowing a migration to the power status S4/5. As discussed hereinabove, the power status S3 as the suspend mode permits only a current to the memory module 32 to flow through the FET switch circuit 40, with the prohibition of a current flow through the FET switch circuits 38 and 42. The power status S3-CD as the suspend/CD mode permits only a current to the CD-ROM module 34 to flow through the FET switch circuit 42, and permits only a current to the memory module 32 to flow through the FET switch circuit 40, with the prohibition of a current flow through the FET switch circuit 38. Furthermore, the power status S4/5-CD as the stop/CD mode permits only a current to the CD-ROM module 34 to flow through the FET switch circuit 42, with the prohibition of a current flow to the FET switch circuits 38 and 40. According to the configuration of the present invention in this manner, each FET switch circuit allows only a current flow to the corresponding load.

According to the present invention as set forth hereinabove, in the case of supplying electric powers to the first load including the CPU and the second load including the memory in compliance with their respective action modes, a separate power supply line is provided for each load with the provision of a switch circuit dedicated to each line so that the switch circuit for each line can be on/off controlled depending on its action mode, whereby a current to one load can flow through one switch circuit corresponding thereto but the sum of currents to a plurality of loads cannot flow through the one switch circuit, so that a minimum amount of current flows through the switch circuit so as to reduce the power loss in the switch circuit and the current capacity, thereby achieving a reduction in the circuit mounting area of the switch circuit as well as a reduction in production costs.

Although the above embodiment has been the case of application to the notebook-sized personal computer by way of example, the present invention is applicable intactly to any information equipment of a type supplying electric powers to a plurality of separate loads in the action mode.

The above embodiment has been the case of supplying powers to the loads in the form of the CPU module 30 and the memory module 32 as well as of the CD-ROM module 34 by way of example. But instead, the present invention could employ a basic minimal configuration including the DC-DC converter 36, the control circuit 40, the first FST switch circuit 38 and the second FET switch circuit 40, for the CPU module 30 and the memory module 32 with the exception of the CD-ROM module 34.

Although the third load has been the CD-ROM module 34 by way of example, any other devices would be available in the case of supplying powers to any separate ones.

Furthermore, the above embodiment has used the FET switch circuits as the switching circuits by way of example. It is however natural that use may be made of transistors or other appropriate switching elements.

It will be appreciated that the present invention is not limited to the above embodiment but that it contains any variants without impairing its objects and advantages and that it is not restricted by the numerical values indicated in the above embodiment.

What is claimed is:

1. An electronic apparatus for feeding electric power to loads in response to a plurality of action modes, said electronic apparatus comprising:

an on/off controllable power source circuit providing electric power as its output through a node to said loads;

a first switch circuit disposed on a power supply line extending from said node to a first load, said first load including a CPU;

a second switch circuit disposed on a power supply line to a second load also extending from the node, said second switch circuit not including any elements of said first switch circuit, and said second load including a memory; and a control circuit providing an on/off control of said power source circuit, said first switch circuit and said second switch circuit in response to said plurality of action modes;

wherein said first switch circuit has two FETs having the same characteristics, the drains and sources of said two FETs being commonly connected in parallel into an electric power source line, and the gates thereof being commonly connected to a corresponding output of said control circuit; and wherein said second switch circuit has an FET having the same characteristics as the FETs of said first switch circuit, the drain and source of said second switch circuit FET being connected to the electric power source line, and the gate thereof being connected to a corresponding output of said control circuit.

2. An electronic apparatus according to claim 1, wherein said control circuit in a first action mode turns on said power source circuit, said first switch circuit and said second switch circuit to permit a supply of electric power to said first and second loads, and wherein said control circuit in a second action mode turns on said power source circuit and said second switch circuit but not said first switch circuit to permit a supply of electric power to only said second load.

3. An electronic apparatus according to claim 2, wherein said first action mode is a normal action mode, and wherein said second action mode is a suspend mode permitting a supply of electric power to only a specific, limited load.

4. An electronic apparatus according to claim 1, further comprising a third switch circuit disposed on a power supply line to a third load diverging from said line on the input side of said first switch circuit, and wherein said control circuit further provides an on/off control of said third switch circuit in response to said action modes.

5. An electronic apparatus according to claim 4, wherein said control circuit in a first action mode turns on said power source circuit, said first switch circuit and said second switch circuit to permit a supply of electric power to said first and second loads, and wherein said control circuit in a second action mode turns on said power source circuit and said second switch circuit but not said first switch circuit to permit a supply of electric power to only said second load; and wherein said control circuit turns on both said power source circuit and said third switch circuit in a third action mode permitting a supply of electric power to said third load in the state of said first action mode, said second action mode or a stop mode.

6. An electronic apparatus according to claim 5, wherein said third load includes a CD drive, and wherein said control circuit defines said third action mode independently of said first action mode, said second action mode or said stop mode so as to allow a replaying action of said CD drive.

7. A circuit board for feeding electric power from a power source circuit through a node to loads in response to a plurality of action modes, said circuit board comprising:

a first switch circuit disposed on a first power supply line extending from said node to a first load, said first load including a CPU;

a second switch circuit disposed on a second power supply line to a second load also extending from the node, said second switch circuit not including any elements of said first switch circuit, and said second load including a memory; and a control circuit providing an on/off control of said power source circuit, said first switch circuit and said second switch circuit in response to said plurality of action modes;

wherein said first switch circuit has two FETs having the same characteristics, the drains and sources of said two FETs being commonly connected in parallel into an electric power source line, and the gates thereof being commonly connected to a corresponding output of said control circuit; and wherein said second switch circuit has an FET having the same characteristics as the FETs of said first switch circuit, the drain and source of said second switch circuit FET being connected to the electric power source line, and the gate thereof being connected to a corresponding output of said control circuit.

8. A circuit board according to claim 7, further comprising a third switch circuit disposed on a third power supply line to a third load diverging from said line on the input side of said first switch circuit, and wherein said control circuit provides an on/off control of said third switch circuit in response to said plurality of action modes.

9. An electronic apparatus for feeding electric power to loads in response to a plurality of action modes, said electronic apparatus comprising:

an on/off controllable power source circuit providing electric power as its output through a node to said loads;

a first switch circuit disposed on a power supply line extending from said node to a first load;

a second switch circuit disposed on a power supply line to a second load also extending from the node, said second switch circuit not including any elements of said first switch circuit;

a control circuit providing an on/off control of said power source circuit, said first switch circuit and said second switch circuit in response to said plurality of action modes, wherein said control circuit in a first action mode turns on said power source circuit, said first switch circuit and said second switch circuit to permit a supply of electric power to said first and second loads, and wherein said control circuit in a second action mode turns on said power source circuit and said second switch circuit but not said first switch circuit to permit a supply of electric power to only said second load; and a third switch circuit disposed on a power supply line to a third load also extending from said node, said third switch circuit not including any elements of said first switch circuit, wherein said control circuit further provides an on/off control of said third switch circuit in response to said action modes;

wherein said control circuit turns on both said power source circuit and said third switch circuit in a third action mode permitting a supply of electric power to said third load in the state of said first action mode, said second action mode or a stop mode;

wherein said first switch circuit has two FETs having the same characteristics, the drains and sources of said two FETs being commonly connected in parallel into a power supply line, and the gates thereof being commonly connected to a corresponding output of said control circuit; and wherein said second switch circuit has an FET having the same characteristics as the FETs of said first switch circuit, the drain and source of said second switch circuit FET being connected to the power supply line, and the gate thereof being connected to a corresponding output of said control circuit.

10. An electronic apparatus according to claim 9, wherein said third load includes a CD drive, and wherein said control circuit defines said third action mode independently of said first action module, said second action mode or said stop mode so as to allow a replaying action of said CD drive.

* * * * *